(12) United States Patent
Deneuve et al.

(10) Patent No.: US 11,891,919 B2
(45) Date of Patent: Feb. 6, 2024

(54) AUTOMATIC BLADE PITCH CONTROL

(71) Applicant: SAFRAN AIRCRAFT ENGINES, Paris (FR)

(72) Inventors: Sébastien Jean Fernand Deneuve, Rouen (FR); Charles Ying, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/909,010

(22) PCT Filed: Mar. 5, 2021

(86) PCT No.: PCT/FR2021/050378
§ 371 (c)(1),
(2) Date: Sep. 2, 2022

(87) PCT Pub. No.: WO2021/176187
PCT Pub. Date: Sep. 10, 2021

(65) Prior Publication Data
US 2023/0094203 A1 Mar. 30, 2023

(30) Foreign Application Priority Data
Mar. 5, 2020 (FR) ....................... 2002249

(51) Int. Cl.
*F01D 7/02* (2006.01)

(52) U.S. Cl.
CPC .......... *F01D 7/02* (2013.01); *F05D 2220/323* (2013.01); *F05D 2220/36* (2013.01);
(Continued)

(58) Field of Classification Search
CPC ... F01D 7/00; F01D 7/02; B64C 11/30; B64C 11/301; B64C 11/305; B64D 31/06;
(Continued)

(56) References Cited

U.S. PATENT DOCUMENTS

2015/0314853 A1* 11/2015 Tantot .................... B64D 31/06 701/3
2016/0280386 A1* 9/2016 Mestler .................. B64D 31/06
(Continued)

FOREIGN PATENT DOCUMENTS

| EP | 3219608 A1 | 9/2017 |
| EP | 3543112 A1 | 9/2019 |
| WO | 2014/083259 A1 | 6/2014 |

OTHER PUBLICATIONS

International Search Report dated Jun. 9, 2021 issued by the International Searching Authority in Application No. PCT/FR2021/050378.
(Continued)

*Primary Examiner* — Elton K Wong
(74) *Attorney, Agent, or Firm* — Sughrue Mion, PLLC

(57) ABSTRACT

The invention relates to a method for controlling a pitch angle of the vanes or blades of a propellant body of a turbine engine, comprising generating a pitch command ($i_{final}$) according to a rotational speed of the propeller ($XN_{mes}$) and a speed setpoint ($XN_{cons}$), the method comprises a nominal regulating chain (13), wherein the pitch command is further generated according to a value of a pitch angle (βmes) of the vanes or blades of the propellant body, and an off-nominal regulating chain (16), wherein the pitch command is generated independently of a value of a pitch angle of the vanes or blades of the propellant body.

7 Claims, 2 Drawing Sheets

(52) U.S. Cl.
CPC .... *F05D 2260/70* (2013.01); *F05D 2270/021* (2013.01); *F05D 2270/305* (2013.01); *F05D 2270/44* (2013.01); *F05D 2270/62* (2013.01); *F05D 2270/80* (2013.01)

(58) Field of Classification Search
CPC ......... F05D 2270/021; F05D 2270/305; F05D 2270/44; F05D 2270/62; F05D 2270/80; F05D 2220/323; F05D 2220/36; F05D 2260/70; G05B 7/02
See application file for complete search history.

(56) References Cited

U.S. PATENT DOCUMENTS

| | | | |
|---|---|---|---|
| 2020/0088112 A1* | 3/2020 | Tang | F02C 6/206 |
| 2020/0247552 A1* | 8/2020 | Lisio | B64D 27/10 |
| 2020/0369370 A1* | 11/2020 | Des Roches-Dionne | B64C 11/303 |

OTHER PUBLICATIONS

French Search Report dated Nov. 17, 2020 in French Application No. 2002249.

\* cited by examiner

AUTOMATIC BLADE PITCH CONTROL

FIELD OF THE INVENTION

The invention relates to the general technical field of turbomachines, more specifically turbomachines with propellers or fans with variable setting, for example turbomachines with twin unducted counter-rotating propellers (conventionally known as open rotor), or turbojet engines with a ducted fan of VPF (Variable Pitch Fan) type, the blades of which have variable setting and are optionally intended to be able to operate in thrust reversal mode (reversal of the direction of passage of the air through the fan).

PRIOR ART

Turbomachines are conventionally equipped with power controlling systems able to command the variation of different parameters, for example the fuel flow rate or the setting angle of the vanes of a fan or the blades of a propeller, in such a way as to adapt the power of the turbomachine to the flight phase. In the remainder of the text, the example that will generally be used is a propeller as being the automated propulsive element, but it will be understood that the automation can apply to any propulsive element consisting of a fan or a propeller. Furthermore, it is assumed that the vanes or blades of a propulsion element are designed to all have one and the same setting angle.

A conventional strategy for automating the rating of a propeller, as shown in FIG. 1, consists in using cascade control with several nested controllers:

- a high-level controller 1 which automates the rating of the propeller XN by commanding a setting β on the basis of a rating measurement XNmes of the engine 2 driving the propeller,
- a local controller 3 which automates the setting angle β by commanding a setting-modifying device 4 based on the return of the position βmes of the setting-modifying device 4.

In such a system, the setting-modifying device 4 acts on the setting β of the vanes or blades of the propulsive element (fan or propeller) in such a way as to vary the rating XN of this propulsive element.

A setting-measuring device 5 takes a setting measurement βmes at the output of the setting-modifying device 4, the setting measurement βmes being returned to the local controller 3.

This measurement of the setting angle can be taken directly, by directly measuring the angle, or indirectly by measuring another parameter which is an "image" of the setting angle. For example the position of an actuator which via a kinetic line will be expressed as a setting angle.

A rating-measuring device 6 takes a measurement of the rating XNmes at the outlet of the engine 2, the rating measurement XNmes being returned to the high-level controller 1.

The rating measurement XNmes and a rating setpoint XNcons are injected into the high-level controller 1, which emits as output a setting setpoint βcons.

The setting setpoint βcons and the setting measurement βmes are injected into the local controller 3, which emits as output a command i which is injected into the setting-modifying device 4.

The problem with this strategy is that in the event of a failure of the setting-measuring device 5, the loop of the local controller 3 can no longer operate, which makes the loop of the high-level controller 1 inoperative.

Conventionally, a safetying of the engine, typically by returning the engine rating to idle with feathering of the vanes or blades of the propulsive element, is commanded as an open loop in the event of loss of the setting-measuring line. This return to open loop is hazardous since the link between the gas generator and the propulsive part of the engine is lost:

- if the setting is decreased too quickly (reduction of the rating of the propellers) while the power of the engine is still high, there is a high risk of overtorque;
- if the propeller is not quickly put in the safety position when its position is not measured, there is a risk that the propeller will enter a region of aerodynamic stall (excitations of the oscillation modes) or even of accidental reversal (an event classified as catastrophic).

In addition, under any circumstances this accommodation translates into a loss of thrust, and a loss of thrust control.

PRESENTATION OF THE INVENTION

One aim of the invention is to provide instrumentation and control for the setting of a propeller with variable setting despite the loss of the setting-measuring line.

The invention makes provision for a method for controlling a setting angle of the vanes or blades of a propulsive element of a turbomachine, comprising the generation of a setting command as a function of a speed of rotation of the propeller and of a rating setpoint; the method comprises a nominal controlling line wherein the setting command is also generated as a function of a value of a setting angle of the vanes or blades of the propulsive element, and a downgraded controlling line wherein the setting command is generated independently of a value of a setting angle of the vanes or blades of the propulsive element.

This makes it possible to continue to control the propeller ratings despite the addition of certain limitations related to the removal of the local loop, for example during a failure that makes the nominal controlling line inoperative, which makes it possible to circumvent a failure by operating the engine differently. Thus, it can be envisioned to continue to operate the engine normally during the stabilized ratings and to just modify the command mode during the transient ratings, which makes it possible to continue to operate the engine.

Advantageously, the invention is completed by the following features, taken alone or in combination:

- the method further comprises a step of selecting the downgraded controlling line or the nominal controlling line;
- the method further comprises a command return step configured to return the setting command to at least one from among the nominal controlling line and the downgraded controlling line; this ensures continuity of the setting angle command when switching between the nominal and downgraded controlling lines;
- the nominal controlling line comprises a first controller configured to supply a setting setpoint as a function of the rating setpoint and the rating measurement, and a second controller configured to supply the nominal setting command as a function of the setting setpoint and the setting measurement;
- the command return line is configured to return the setting command to at least one from among the second controller and the downgraded controlling line, and the second controller is configured to supply the nominal setting command as a function of the setting setpoint, the setting measurement and the setting command;

the rating setpoint is a function of a power delivered by the turbomachine and is variable between a lower limit and an upper limit, the lower limit being configured to avoid an overtorque at the level of the propeller, the upper limit being configured to avoid an aerodynamic stall of the propeller;

the rating setpoint has a limited gradient; this makes it possible to limit the setpoint variations and thus smooth the command curve increasing the safety of the driving mode.

According to another aspect, the invention makes provision for a device for controlling the setting of a propeller of a turbomachine comprising an actuator configured to modify a setting angle of the propeller, the controlling device comprising:
- a controller,
- a first sensor configured to determine a value of a setting angle of the propeller,
- a second sensor configured to determine a speed of rotation of the propeller, the controller being configured to:
  - in a nominal controlling mode, supply a nominal setting command to the actuator as a function of a rating setpoint, of the value of the setting angle and of the speed of rotation of the propeller;
  - in a downgraded controlling mode, supply a downgraded setting command to the actuator as a function of the rating setpoint and of the speed of rotation of the propeller, independently of the value of the setting angle;

the controlling device further comprising a selector configured to select the nominal controlling mode or the downgraded controlling mode of the controller.

According to another aspect, the invention makes provision for a turbomachine comprising a propeller with variable setting and a device for controlling the setting according to the invention, wherein the controller implements a method for controlling the setting according to the invention.

According to another aspect, the invention makes provision for an aircraft comprising a turbomachine according to the invention.

DESCRIPTION OF THE FIGURES

Other features and advantages of the invention will become further apparent from the following description, which is purely illustrative and non-limiting, and must be read with reference to the appended figures wherein.

DETAILED DESCRIPTION OF THE INVENTION

Figure 1:
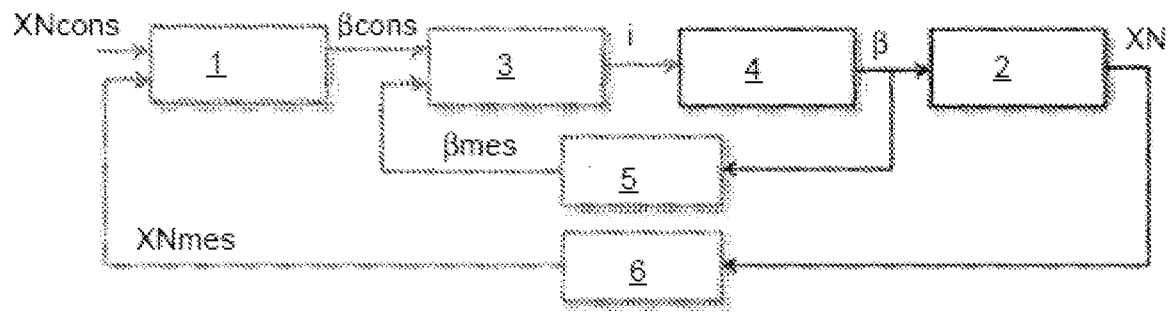
FIG. 1 is a schematic model of an architecture of a system for controlling the setting of the vanes of a propeller of the prior art.
Figure 2:
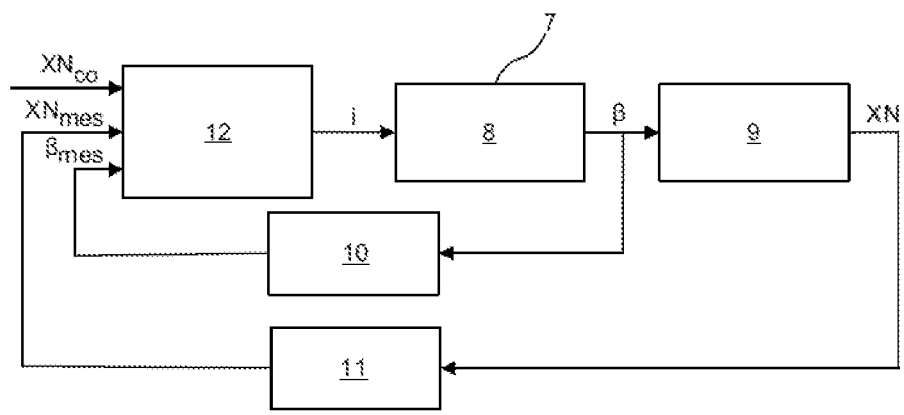
FIG. 2 is a schematic model of an architecture of a system for controlling the setting of the vanes of a propeller according to the invention.

With reference to FIG. 2, an embodiment of a rating-controlling system 7 includes:

- a setting-modifying actuator 8 configured to modify the setting of a propeller as a function of a propeller setting modification setpoint;
- a turbomachine 9 configured to rotationally drive the propeller;
- a first sensor 10 configured to measure the setting angle of a propeller;
- a second sensor 11 configured to measure the rotation speed of the propeller;
- a controller 12 configured to issue a command i to change a setting of a propeller as a function of a rating setpoint XNcons, a value of setting angle βmes measured by the first sensor 10 and a measurement of rotation speed XNmes emitted by the second sensor 11.

Figure 3:
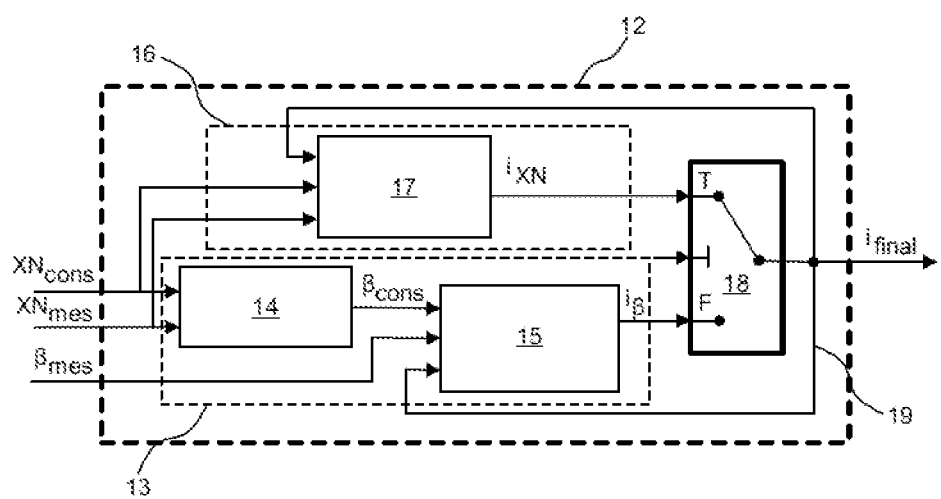
FIG. 3 is a schematic model of the functional structure of a macro-controller of a system for controlling the setting of the vanes of a propeller according to the invention.

The controller 12, with reference to FIG. 3, includes:
- a nominal controlling line 13 including a first controlling command 14 configured to generate a setting-modifying setpoint βcons as a function of the rating setpoint XNcons and of the rating measurement XNmes, and a second controlling step 15 configured to generate a nominal setpoint iβ as a function of the setting measurement βmes and of the setting-modifying setpoint βcons;
- a downgraded controlling line 16 including a third controlling step 17 configured to generate a downgraded setpoint iXN as a function of the rating setpoint XNcons and the rating measurement XNmes;
- a selector 18 configured to select a controlling line from among the nominal controlling line 13 and the downgraded controlling line 16, the selector 18 being triggered by the receipt of a failure signal causing the selection of the downgraded controlling line 16.

The failure signal is generated during troubleshooting, which can be done conventionally by:
- range tests on the acquisition of the setting angle to make sure that the measured value is plausible, these range tests being able to be connected to the sensors (measurement range) or to the engine (at a particular operating point, the setting angle is expected to be in a certain area);
- deviation tests between channels: the acquisitions are generally duplex and this ensures that the two measurements are consistent.

If the measurements are not consistent, it is considered that a failure is detected.

Such a management of the controller 12 makes it possible to continue to control the propeller ratings despite the addition of certain limitations related to the removal of the local loop, for example during a failure that makes the nominal controlling line 13 inoperative.

Such a structure in particular makes it possible to improve the robustness of the setting angle measurement in the presence of a failure, for a turbopropeller engine with a variable-setting fan, or turbojet engines with unducted fans of VPF type, the vanes of which have variable setting and are optionally designed to be able to operate in thrust reversal mode, or a twin-propeller unducted turbopropeller engine, commonly known as "open rotor".

In a preferred embodiment, the controller 12 comprises a return step 19 configured to return the setting command $i_{final}$:
- to the second controlling step 15, which makes it possible to ensure the continuity of the nominal setpoint iβ;
- to the third controlling step 17, which makes it possible to ensure the continuity of the downgraded setpoint iXN;
- preferably, to the second controlling step 15 and the third controlling step 17, which makes it possible to ensure the continuity of the nominal setpoint iβ, of the downgraded setpoint iXN, and of the nominal iβ and downgraded iXN outputs with one another such that the output of the controller 12 is continuous even when the selector 18 passes from the nominal controlling line 13 to the downgraded controlling line 16 or conversely if the failure is rehabilitated.

Specifically, the controlling line not selected by the selector 18 is thus continually updated to avoid an abrupt change of the setpoint value when the unselected controlling line is selected. The term "selected" should here be understood to mean that the controlling line is connected to the output of the controller 12 by the selector 18.

Figure 4:
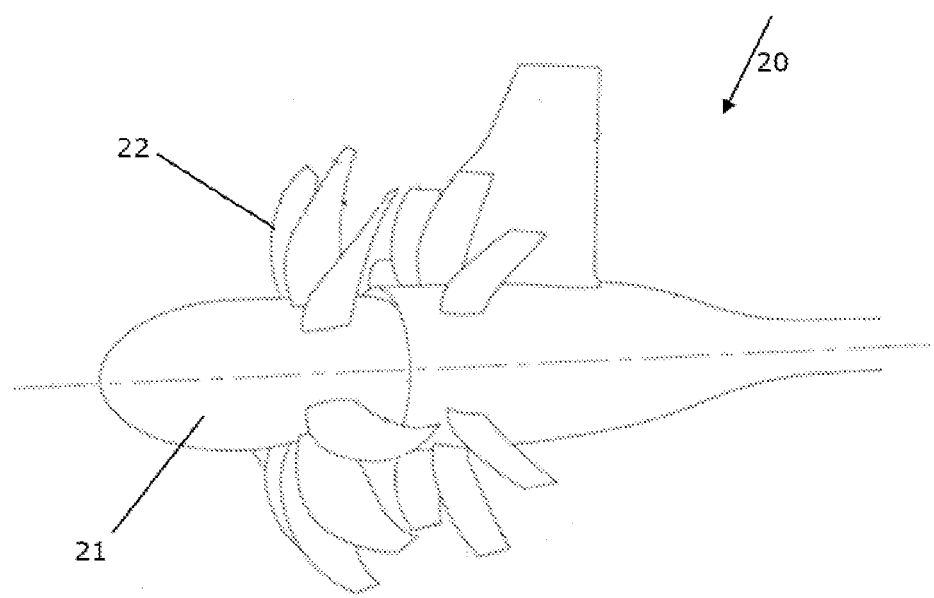
FIG. 4 is a schematic model of a turbomachine with a variable setting propeller, such as a turbomachine with a twin unducted fan commonly known as "open rotor".

When the setting-controlling system 7 is associated with a turbomachine comprising a propeller with variable setting, such as an "open rotor" 20 shown in FIG. 4 comprising at least one rotor 21 equipped with a plurality of blades 22 with variable setting, the assembly can be implemented in two operating modes.

The gas generator 9, formed by the low-pressure and/or high-pressure spool of the turbomachine and comprising at least a compressor and at least a turbine, rotationally drives the rotor 21 and delivers a constant power, defined by a pilot or an automatic piloting method.

As a function of the envisioned flight phase, for example a climb, descent or cruise flight, the speed of rotation of the rotor 21 can vary in order to optimize the propulsive efficiency of the blades 22. It can therefore be decided to modify the setting of the blades 22 in order to vary the forced exerted by the air on the blades 22, thus modifying the torque applied to the rotor and the speed of rotation of said rotor 21.

In the case of nominal operation, the nominal controlling line 13 is selected.

The first sensor 10 (not shown in FIG. 4) measures the setting of the blades 22 and returns this information to the controller 12. The second sensor 11 measures the rating of the rotor 21 and returns the information to the controller 12.

As a function of the thrust needed for the flight phase, a rating setpoint XNcons is communicated to the controller 12.

The first controlling step 14 compares the rating setpoint XNcons and the rating measurement XNmes. As a function of the difference observed, a setting-modifying setpoint cons is communicated by the first controlling module 14 in the second controlling step 15.

The second controlling step 15 compares the setting modification setpoint βcons and the setting measurement βmes, and transmits a setting command current iβ as a function of the difference observed.

The setting-modifying actuator 8 modifies the setting β of the blades 22 as a function of the setting command current iβ received, which has the effect of modifying the rating XN of the rotor 22.

In the event of a failure of the nominal controlling line 13, for example a failure of the first sensor 10, the selector 18 switches to the downgraded controlling line 16. The third controlling step 17 is managed in such a way as to dispense with the setting measurement βmes and directly controls the setting-modifying actuator 8 on the basis of the separation between the rating setpoint XNcons and the rating measurement XNmes. The controller 12 is thus especially designed to handle this input-output pair and emit a signal used to control the high dynamic of the setting-modifying actuator 8.

The controlling line that is not selected remains consistent with the state of the system using the feedback 19. The principle of the feedback is to reconstitute the internal state of the unselected controlling line in such a way that if it had been enabled, it would have resulted in the same output. It is for this reason that the selected command current $i_{final}$ (which is sent to the actuator 8) is involved in the second and third controlling steps. In this way when there is a switch from one controlling line to another the transition is gentle without any abrupt variation of the command signal.

On disabling the nominal controlling line 13, a software setting stop, configured to limit the minimum accessible setting, is consequently removed since it makes use of the setting measurement in such a way as to limit the setting setpoint when the minimum setting stop is reached.

This protection is particularly useful when the propeller rating setpoints are poorly adapted to the power delivered by the engine. The controller 12 can then request a low setting without any protection preventing it from doing so, which could send the propellers into the aerodynamic stall region.

It is therefore necessary to have adaptive power management, which is used to reduce as much as possible the risk of having propeller rating setpoints which are too high in relation to the power delivered by the engine.

Limitations of minimum-maximum type are therefore imposed on the rating setpoints XNcons as a function of the power of the engine:
  a minimum rating setpoint threshold protects from over-torques, which are caused when the power delivered by the engine cannot be converted by the propeller due to excessive setting;
  a maximum rating setpoint threshold protects from entry into the aerodynamic stall region.

These limitations are related to the design of the blades and engine, and are input data supplied by the designer.

The power management must be developed to take into account additional limitations related to the disabling of the nominal controlling line 13 upon the enabling of the downgraded controlling line 16.

The dynamic limitations on the setting angle can in particular no longer be controlled by the nominal controlling line 13, so it is necessary to make an accommodation of the rating setpoints XNcons by decreasing the gradients of the setpoints.

The gradients of the setpoints are determined as a function of the dynamic limitations of the setting angle, which are known and defined for nominal operation, as well as the relationships between the rating and the setting which are known at the time of design. It is then possible to determine the dynamic limitations on the ratings, optionally by adding safety margins.

Several driving methods can be envisioned for handling the accommodation of the rating setpoints.

In a first driving mode, the engine continues to operate normally with the accommodation of the rating setpoints. The control of the rating makes it possible to continue to operate the engine. The engine is operated normally and supplies the thrust during the stabilized ratings. During the transient ratings, the accommodation of the rating setpoints is softened, by limiting variations, which makes it possible to continue to operate the engine and avoids losses of thrust control. This can in particular make it possible to finish the flight under normal conditions, by avoiding loss of thrust control, to perform maintenance once on the ground. This first driving mode is preferred when the propellers can be driven with healthy behavior, which implies that a variation in setting causes a monotonic variation in the propeller rating. This specifically makes it possible to keep the engine operable.

In a second driving mode, a safe return to the safety position is made owing to the control of the rating setpoints. This reduces risk for the engine at the cost of a loss of thrust control. This second driving mode is preferably adopted when the propellers can be driven with behavior that is deemed unhealthy.

In a third driving mode, used in the event of the propellers being undrivable, a command current is directly imposed on the actuator without any control of the ratings, in such a way as to make a return to feather idle in open loop.

The invention claimed is:

1. A method for controlling a setting angle of vanes or blades of a propeller of a turbomachine, the method comprising generating a setting command, the setting command being a function of a speed of rotation of the propeller and of a rating setpoint,
wherein generating the setting command comprises:
generating, in a nominal controlling line, a nominal setting command as a function of a value of a setting measurement of the vanes or the blades of the propeller, and
generating, in a downgraded controlling line, a downgraded setting command independently of the value of the setting measurement of the vanes or the blades of the propeller,
wherein the method further comprises:
a selection step of selecting the downgraded controlling line so that the setting command is equal to the downgraded setting command, or the nominal controlling line so that the setting command is equal to the nominal setting command,
a supply step of supplying the setting command to an actuator configured to modify the setting angle, and
before the supply step and after the selection step, a command return step so that the setting command is directly sent to at least one of the nominal controlling line and the downgraded controlling line,
wherein the actuator changes the setting angle based on the setting command.

2. The method as claimed in claim 1, wherein the nominal controlling line comprises:
a first controller configured to supply a setting setpoint as a function of the rating setpoint and the speed of rotation of the propeller, and
a second controller configured to supply the nominal setting command as a function of the setting setpoint and the setting measurement.

3. The method as claimed in claim 2, wherein a command return line for the command return step is configured to return the setting command to at least one of the second controller and the downgraded controlling line, and wherein the second controller is configured to supply the nominal setting command as a function of the setting setpoint, the setting measurement and the setting command.

4. The method as claimed in claim 1, wherein the rating setpoint is a function of a power delivered by the turbomachine, the rating setpoint being variable between a lower limit and an upper limit, the lower limit being configured to avoid an overtorque at the level of the propeller, the upper limit being configured to avoid an aerodynamic stall of the propeller.

5. A device for controlling the setting of a propeller of a turbomachine comprising an actuator configured to modify a setting angle of the propeller, the device comprising:
a controller,
a first sensor configured to determine a value of a setting angle of the propeller,
a second sensor configured to determine a speed of rotation of the propeller, the controller being configured to:
in a nominal controlling mode, supply a nominal setting command to the actuator, the nominal setting command being a function of a rating setpoint, of the value of the setting angle and of the speed of rotation of the propeller;
in a downgraded controlling mode, supply a downgraded setting command to the actuator, the downgraded setting command being a function of the rating setpoint and of the speed of rotation of the propeller, the downgraded setting command being independent on the value of the setting angle;
the device further comprising a selector configured to select the nominal controlling mode or the downgraded controlling mode of the controller, and supply the nominal setting command or the downgraded setting command that corresponds to the nominal controlling mode or the downgraded controlling mode that is selected to an actuator configured to modify the setting angle,
wherein the actuator changes the setting angle based on the nominal controlling mode or the downgraded controlling mode selected by the selector.

6. A turbomachine comprising a propeller and the device as claimed in claim 5, wherein the controller is configured to: generate, in a nominal controlling line, the nominal setting command, and
generate, in a downgraded controlling line, the downgraded setting command,
wherein the value is a value of a setting measurement of vanes of the propeller or of blades of the propeller.

7. An aircraft comprising the turbomachine as claimed in claim 6.

* * * * *